United States Patent
Kiya et al.

(10) Patent No.: US 8,013,947 B2
(45) Date of Patent: Sep. 6, 2011

(54) DISPLAY DEVICE AND MANUFACTURING METHOD OF THE SAME

(75) Inventors: Yoshiyuki Kiya, Mobara (JP); Kunihiko Watanabe, Chiba (JP); Toshikazu Horii, Ooamishirasato (JP); Takao Takano, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 12/591,874

(22) Filed: Dec. 3, 2009

(65) Prior Publication Data
US 2010/0085532 A1 Apr. 8, 2010

Related U.S. Application Data

(62) Division of application No. 10/777,173, filed on Feb. 13, 2004, now abandoned.

(30) Foreign Application Priority Data

Mar. 14, 2003 (JP) .................................. 2003-069626

(51) Int. Cl.
*G02F 1/1343* (2006.01)
(52) U.S. Cl. ......................................................... 349/55
(58) Field of Classification Search .................. None
See application file for complete search history.

(56) References Cited

U.S. PATENT DOCUMENTS

| | | | |
|---|---|---|---|
| 4,752,118 A | 6/1988 | Johnson | |
| 5,151,807 A | 9/1992 | Katayama et al. | |
| 5,343,216 A | 8/1994 | Katayama et al. | |
| 5,518,956 A | 5/1996 | Liu et al. | |
| 6,177,714 B1 | 1/2001 | Nagai | |
| 6,909,111 B2 | 6/2005 | Yamagata et al. | |

FOREIGN PATENT DOCUMENTS

| | | |
|---|---|---|
| JP | 2-55338 | 8/1988 |
| JP | 3-24524 | 6/1989 |
| JP | 10-229-125 | 2/1997 |
| JP | 11-38448 | 11/1997 |
| JP | 2000-347217 | 6/1999 |
| JP | 2002-82346 | 9/2000 |
| JP | 2002-260857 | 12/2001 |

OTHER PUBLICATIONS

Machine translation of JP 06-238161.*

* cited by examiner

*Primary Examiner* — Lucy Chien
(74) *Attorney, Agent, or Firm* — Stites & Harbison PLLC; Juan Carlos A. Marquez, Esq.

(57) ABSTRACT

Conventionally, when a protective/insulation film is present above a film to be corrected, only a defect of the film to be corrected below such an upper-layer film is corrected without damaging the upper-layer film. A display region of a display device has an insulation film, a semiconductor film and a conductive film formed in a given pattern and stacked on a substrate. When at least one of a correction portion out of a correction portion which separates a short-circuit defect, a correction portion which connects an opening defect, a correction portion which removes a standard deviation defect, and a correction portion which separates a standard deviation defect of the pattern is corrected, at least one upper-layer film is present above a film to be corrected at the correction portion and the correction is applied to the film to be corrected while leaving the upper-layer film intact.

12 Claims, 8 Drawing Sheets

DISPLAY DEVICE AND MANUFACTURING METHOD OF THE SAME

CROSS REFERENCE TO RELATED APPLICATIONS

This application is a Divisional application of U.S. application Ser. No. 10/777,173 filed on Feb. 13, 2004, now abandoned which claims priority from Japanese Application 2003-069626 filed Mar. 14, 2003, the content of which is hereby incorporated by reference into this application.

BACKGROUND OF THE INVENTION

1. Field of the Invention

The present invention relates to a display device, and more particularly to a display device and a manufacturing method thereof which enable a normal display by correcting a defective display such as point defects.

2. Description of the Related Art

A panel type display device such as a liquid crystal display device, an organic EL display device or the like includes a display region which is formed by stacking a plurality of films including an insulation film, a semiconductor film and a conductive film which are formed in a given pattern on an insulation substrate made of glass or the like. Particularly, with respect to an active matrix type display device which arranges a large number of pixels each having a switching element such as a thin film transistor or the like (an active element, hereinafter referred to as a thin film transistor) in a matrix array, in a manufacturing step of the substrate on which the above-mentioned thin film transistors and the like are arranged (a thin film transistor substrate), there arise defects attributed to mixing of foreign substances into films which constitute the thin film transistors, various wirings and various electrodes or to the deformation of pattern and these defects bring about a defective display.

A defective display (display defect) per pixel unit which occurs on the semiconductor film, the source electrode and the drain electrode which constitute the thin film transistor is referred to as a point defect, while with respect to a defect which causes short-circuiting or connection of lines which supply drive signals to thin film transistors, there may be a case in which a linear or strip-like display defect appears on a screen. The defects which are particularly large in number are point defects (defective lighting) and this defective lighting of the pixel degrades the quality of display images. Conventionally, to cope with the defective display attributed to such defects, processing which enables a normal image display by forming the defective pixel into a black point thus making the defective pixel less apparent, or by applying working (trimming) in which a deviating portion of a connected film or a connecting portion with a film of a neighboring pixel is removed to satisfy the design specification is conducted. However, when the number of the pixels which are formed into the black points is increased, the quality of the display screen as a whole is lowered. When the generated point defect is constituted of short-circuiting of the conductive films, the correction which separates a short-circuited conductive film by irradiating laser beams from an uppermost layer side of various films which are formed in a stacked manner is performed. Here, as literatures which disclose this type of related art, Japanese Unexamined Patent Publication 2000-347217, Japanese Unexamined Patent Publication Heill (1999)-38448 and Japanese Unexamined Patent Publication 2002-82346 can be named.

SUMMARY OF THE INVENTION

As the display defect on the active matrix substrate which constitutes the display device, there exist following defects. For example, a connection defect (also referred to as a short-circuit defect) when semiconductor films which constitute active layers of thin film transistors of neighboring pixels are connected to each other or a pattern defect which deviates from a design specification (a standard deviation defect), a short-circuit defect or a pattern defect between neighboring pixel electrodes, a connection defect (a short-circuit defect) or a pattern defect or an open defect such as a disconnection between neighboring scanning signal lines, between neighboring data signal lines or between a scanning signal line and a data signal line, a connection defect (a short-circuit defect) and an open defect between conductive films such as a connection defect (a short-circuit defect) between a source electrode and a drain electrode of the thin film transistor and the like are named.

When a separation correction, a connection correction and a pattern correction using removal and separation are performed with respect to these short-circuit defect, open defect and standard deviation defect by irradiating laser beams from an uppermost layer of a plurality of stacked films, there is considered a case in which the film which contains such a defect to be corrected is not positioned as the uppermost layer. In such a case, when the laser beams are irradiated from the uppermost layer, the upper layer films such as a protective film and an insulation film which have no defects are also damaged (receive damages) and are removed and hence, the semiconductor film loses original display characteristics or gives rise to new defects whereby it is difficult to ensure the reliability for a long period. Further, it is difficult to perform the inspection and the correction in a state that a protective film and an insulation film are not provided to an uppermost layer. Even when the inspection and the correction may be performed in a state that the protective film and the insulation film are not provided to an uppermost layer, there exits possibility that foreign substances adhere to the protective film and the insulation film in the course of ensuing formation of the protective film and the insulation film and hence, there still exists a drawback in terms of reliability. Further, the correction based on the formation of black points merely makes the defects less apparent and hence, this correction still fails to provide the normal display.

Accordingly, it is an object of the present invention to provide a display device and a manufacturing method thereof which, even when a protective film, an insulation film or the like is present above a film containing a defect to be corrected, can eliminate the display defect by correcting only the defect of the lower-layer film containing the defect to be corrected without damaging the upper-layer film whereby the reliability of the display device can be enhanced.

The present invention is characterized by performing the correction on a lower-layer film while leaving an upper-layer film as it is at a point of time that a defect is corrected. For example, when a laser is used, a wavelength, an output and an irradiation method of laser beams which are used for the defect correction are optimized. That is, the separation, the connection or trimming of a film to be corrected is realized by irradiating laser beams in optimum conditions for performing the separation, the connection or trimming of only the film to be corrected without damaging the upper-layer film.

FIG. 17 is an explanatory view showing the relationship between a wavelength and absorbance of laser beams for various films formed on a substrate which constitutes a display device in an example where the various films are formed of a semiconductor and an insulation film. Here, an amorphous silicon (a-Si) semiconductor film which constitutes an activated layer of a thin film transistor and an insulation film (a PAS film: SiN here) which is present above the semiconductor film are used as the example. The wavelength (nm) of the laser beams is taken on an axis of abscissas and absorbance (relative value) is taken on an axis of ordinates in FIG. 17. Laser beams having a wavelength of 250 nm to 350 nm are absorbed in the a-Si semiconductor film and are hardly absorbed in the insulation film SiN which is present above the a-Si semiconductor film. Also among a metal wiring film, a transparent conductive film and the insulation film, particular absorbance relationships are recognized with respect to these respective films.

Under these facts, the present invention is characterized by adopting following correction methods (A), (B) with respect to the correction of a semiconductor film which constitutes an activated layer of a thin film transistor, for example.

(A) In trimming which performs the correction of a connection defect (a short-circuit defect), that is, the separation correction when the semiconductor films are connected to each other between neighboring pixels, laser beams having a wavelength of approximately 250 nm to 350 nm are irradiated from an insulation film SiN side, and (B) By irradiating laser pulses of low output to the same portion plural times, damages to layers other than the semiconductor film which are caused by the thermal damage other than the absorbance can be suppressed to a minimum level.

Also conventionally, when a trimming range is larger than a movable range of laser beams or when a shape to be corrected is complicated so that a single irradiation cannot perform the sufficient correction, the laser beam irradiation is performed plural times. However, the present invention differs from the conventional technique with respect to a point that the laser beams are irradiated to the same portion by dividing the laser beams plural times. Further, also with respect to films other than the semiconductor film, for example, conductive films such as scanning signal lines (scanning electrodes), data signal lines or the like or transparent electrodes such as pixel electrodes formed on the substrate, using laser beams having wavelengths and outputs corresponding to absorbance characteristics of the films to be corrected, the laser beams are irradiated to the same position to be corrected by dividing the laser beams a plural times.

Due to such corrections, the damage on films other than the films to be corrected, particularly the damage on the film above the film to be corrected can be minimized and hence, the defective display can be suppressed whereby it is possible to obtain the display device which ensures the reliability for a long period. Further, different from the formation of black points, it is possible to make the display device perform the normal display.

Further, according to the present invention, since the thermal damage at the time of laser beam irradiation can be suppressed to a minimum level, the induction of other defects and the occurrence of mechanical damage such as the peeling-off of films can be suppressed thus also giving rise to an advantageous effect that the characteristics defects on driving of pixels such as the deterioration of characteristics of thin film transistors attributed to drawing of hydrogen from the semiconductor film are hardly generated. Still further, depending on the layer to be corrected, it is possible to perform the correction such that the semiconductor film receives no damage in appearance in principle.

To explain the representative constitutions of the present invention, they are as follows.

(1) A display device according to the present invention forms a display region where a plurality of films including an insulation film, a semiconductor layer and a conductive film are patterned in a given pattern and are stacked on a substrate, wherein at a point of time that at least one correction portion out of a correction portion which separates a short-circuit defect, a correction portion which connects an opening defect, a correction portion which removes a standard deviation defect, and a correction portion which separates a standard deviation defect of the pattern is corrected, at least one upper-layer film is present above a film to be corrected at the correction portion and the correction is applied to the film to be corrected while leaving the upper-layer film as it is.

Further, in the display device according to the present invention, as a modification thereof, the correction of the correction portion is performed by the irradiation of laser beams. Further, the correction of the correction portion is performed by irradiating the laser beams from a side opposite to the substrate. The laser beams are irradiated to the same portion by dividing the laser beams plural times. Further, the upper-layer film above the film to be corrected includes at least either one of an insulation film and a transparent conductive film. Due to the above-mentioned correction of the portions to be corrected, a display of the display region can be performed normally. According to the present invention, these constitutional features can be used in a single form as well as in combination.

(2) A manufacturing method of a display device according to the present invention includes:

a film forming step in which a plurality of films including an insulation film, a semiconductor film and a conductive film are stacked to a substrate; and a defect portion correcting step in which at least one correction out of a short-circuit defect portion separation correction which separates a short-circuit defect, an open defect portion connection correction which performs a connection of an open defect, a standard deviation defect portion removal correction which performs a removal of a standard deviation defect, and a standard deviation defect portion separation correction which performs a separation of a standard deviation defect portion generated in the formed film is performed, wherein at a point of correction time of the defect portion correction step, at least one upper-layer film is present above a film to be corrected at the correction portion and the correction is applied to the film to be corrected while leaving the upper-layer film as it is.

Further, in the manufacturing method of the display device of the present invention, as a modification thereof, the correction is performed by irradiating laser beams. Further, the laser beams are irradiated to the substrate from a side opposite to the substrate. The laser beams are irradiated to the same portion by dividing the laser beams plural times. The number of division is set at least 10 times. An irradiation interval is equal to or more than 0.3 seconds. A wavelength of the laser beams is set to a wavelength which allows the laser beams to be more easily absorbed in the film to be corrected than the upper-layer film. When the film to be corrected is an amorphous silicon semiconductor film, a wavelength of the laser beams is set to 250 nm to 360 nm and an output of the laser beams is set to 0.02 W/cm$^2$. Here, laser beams to be irradiated to the same portion is irradiated by dividing the laser beams at least 10 times. The above-mentioned upper-layer film includes at least either one of an insulation film and a transparent conductive film. The semiconductor film is an amorphous semiconductor film and the amorphous semiconductor film is subjected to the separation correction or the removal correction.

An activated layer of a thin film transistor which has a source electrode and a drain electrode is constituted by the semiconductor film and the semiconductor film includes an intrinsic semiconductor film and a contact film formed over the intrinsic semiconductor film, wherein the separation correction of a defect which short-circuits the source electrode and the drain electrode through the contact film is performed by removing the contact film present between the source electrode and the drain electrode together with a portion of the intrinsic semiconductor film.

The conductive film is at least one of a scanning signal line, a video signal line and a pixel electrode, and the separation correction is a correction of a short-circuit defect between the scanning signal lines, a short-circuit defect between the video signal lines, or a short-circuit defect between the pixel electrodes. Here, the pixel electrode is a transparent conductive film. Further, a normal display is performed by these corrections.

The present invention can use these constitutional features in a single form or in combination.

The present invention is basically characterized by separation correction and trimming of the short-circuit defect of the patterned film. However, for example, it is also possible to perform the connection correction of the open defect which connects the portions to be originally connected to each other by melting and fluidizing the conductive film without removing by adjusting an output of the laser beams. In such a manner, according to the present invention, it is possible to largely enhance a manufacturing yield rate and, as a result, the reduction of cost of the display device can be realized. It is needless to say that the display device of the present invention is not limited to the liquid crystal display device and the present invention is applicable to other active matrix type display device such as an organic EL display device.

DESCRIPTION OF THE PREFERRED EMBODIMENTS

Figure 1:
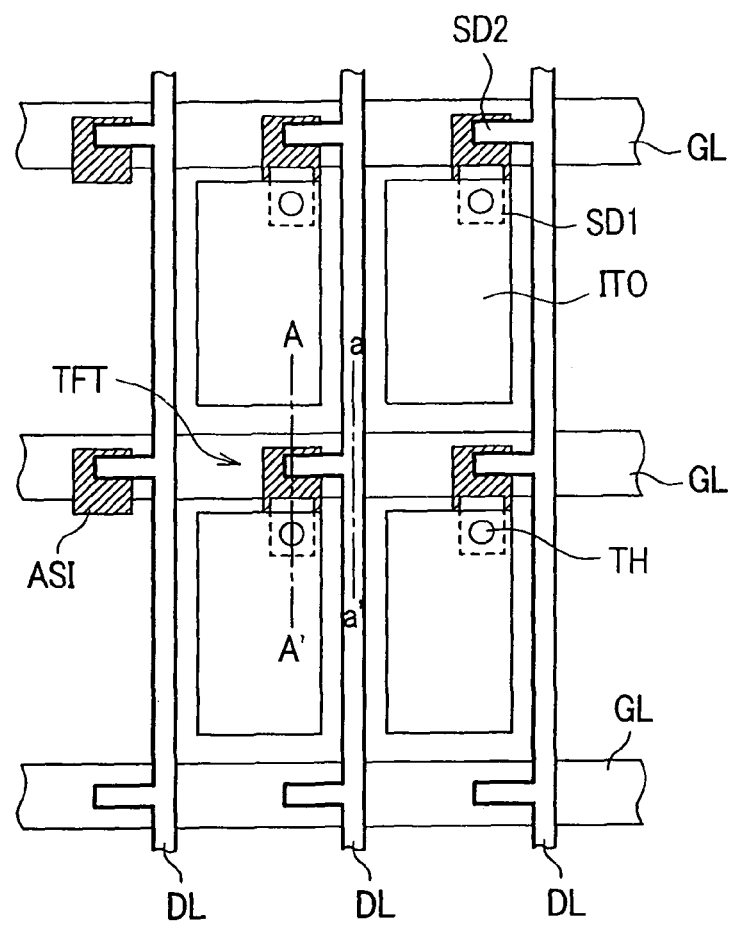
FIG. 1 is a plan view of an essential part for explaining a pixel arrangement of a display device according to the present invention.
Figure 2:
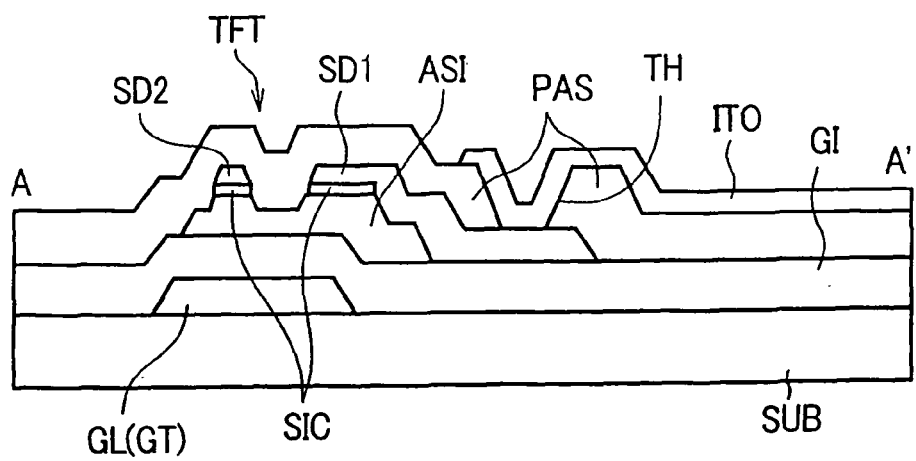
FIG. 2 is a cross-sectional view taken along a line A-A' in FIG. 1.

Preferred embodiments of the present invention are explained in detail in conjunction with drawings which show embodiments. Here, in the following embodiments, a liquid crystal display device is explained as an example. FIG. 1 is a plan view of an essential part for explaining a pixel arrangement of a display device according to the present invention and FIG. 2 is a cross-sectional view taken along a line A-A' in FIG. 1. FIG. 1 shows four pixels on a substrate. This substrate is a thin film transistor substrate which includes a thin film transistor TFT for each pixel and a large number of pixels each having the thin film transistor are arranged over a glass substrate SUB. One pixel is constituted of a pixel electrode ITO which is connected to a source electrode SD1 of a thin film transistor TFT formed on a crossing portion between a scanning signal line GL (constituting a gate electrode GT at a portion of the thin film transistor TFT) and a video signal line (date line) DL through a contact hole TH. To explain the structure in a manufacturing process, it is as follows. Symbol SD2 indicates a drain electrode of a thin film transistor TFT. In the embodiments described hereinafter, the explanation is made by mainly focusing on the separation correction of a short-circuit defect and the connection correction of an open defect. The correction of a standard deviation defect is performed by trimming. The correction of the standard deviation defect includes two types of corrections, that is, the removal correction which removes the substantially whole deviating portion and the separation correction which removes a portion (the vicinity of a normal pattern) so as to separate an extra portion. Here, the correction of standard deviation defect is basically equal to the separation correction of the short-circuit defect with respect to a point that at least a portion is removed.

First of all, a glass substrate SUB having a size of 370 mm×470 mm is cleaned and a metal thin film is formed over the glass substrate SUB by sputtering or the like. Here, a chromium thin film having a thickness of 200 nm is formed. This metal thin film is patterned using a photolithography step including coating of a resist and a mask exposure step and an etching step thus forming scanning signal lines (gate lines) GL (also forming gate electrodes GT of the thin film transistors). After removing the resist using the photolithography step and the etching step, a silicon nitride (SiN) thin film having a film thickness of 400 nm is formed as gate insulation films GI by a plasma CVD method and, thereafter, an amorphous silicon (a-Si) film ASI (intrinsic semiconductor film) having a thickness of 250 nm is formed. To impart conductivity to the a-Si film ASI for connection with source electrodes SD1 and drain electrodes SD2 which are formed in a next step, an amorphous silicon (n+a-Si) film which is doped with phosphorus (P) is formed on the a-Si film ASI as a continuously stacked layer thus forming a contact film SIC having a film thickness of 50 nm. The semiconductor film is constituted of the a-Si film ASI and the contact film SIC.

Thereafter, a photoresist pattern is formed on the semiconductor film using a well-known photolithography method, and activated layers (islands) of thin film transistor are formed in semiconductor films by applying forming by a dry etching method which uses sulfur hexafluoride and hydrogen chloride. After removing the resist, as a metal film which becomes the source electrodes SD1 and the drain electrodes SD2, a chromium film having a thickness of 200 nm is formed by sputtering. Then, by etching the chromium film using the well-known photolithography method and the etching method, the source electrodes SD1 and the drain electrodes SD2 are formed. Here, the video signal lines DL are also simultaneously formed.

Using the pattern of the source electrodes SD1 and the drain electrode SD2 as a mask, the semiconductor film is etched using a mixed gas of sulfur hexafluoride and hydrogen chloride thus obtaining a film thickness corresponding to a design value 150 nm. The resist used for forming the pattern is removed and SiN is formed as a film using a plasma CVD method thus forming a protective film PAS having a thickness of 300 nm. The protective film PAS is patterned using well-known photolithography method and etching method thus removing the resist. Next, a transparent conductive film having a thickness of 150 nm made of indium oxide and tin oxide is formed using a sputtering method and, thereafter, the pixel electrodes ITO are formed using well-known photolithography method and the etching method. Finally, the thin film transistor substrate is obtained by removing the resist.

First Embodiment

Figure 3:
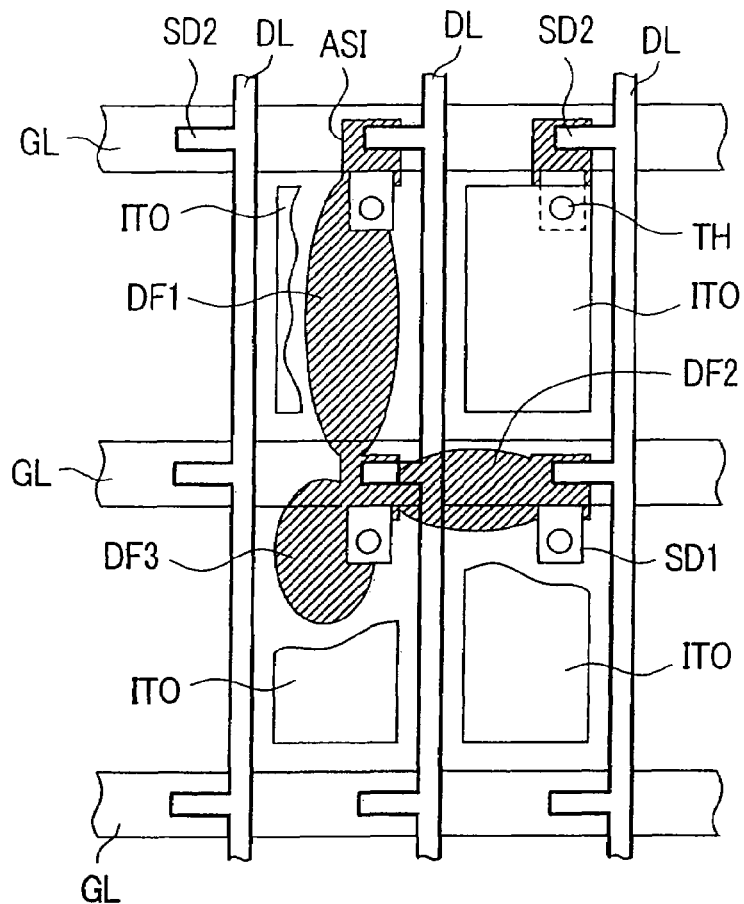
FIG. 3 is a plan view similar to FIG. 1 for explaining one example of a short-circuit defect of a semiconductor film which is one of defects of a thin film formed on a thin film transistor substrate.

FIG. 3 is a plan view similar to FIG. 1 for explaining one example of a short-circuit defect of a semiconductor film which constitutes one of defects of a thin film formed on a thin film transistor substrate. As shown in FIG. 3, semiconductor films ASI (including also a contact film SIC, this definition being applicable to description hereinafter in the same manner) which constitute thin film transistors of neighboring pixels are connected to each other. The connecting portions are indicated as defects DF1, DF2. These defects are referred to as short-circuit defects. To correct these defective thin film transistors into normal thin film transistors, it is necessary to separate these short-circuit defects. Further, a defect DF3 is a standard deviation defect. A capacitance is generated between an a-Si island and a pixel electrode ITO due to the presence of the defect DF3 thus forming a bright point defect. Accordingly, it is necessary to remove or separate the standard deviation defect.

Figure 4:
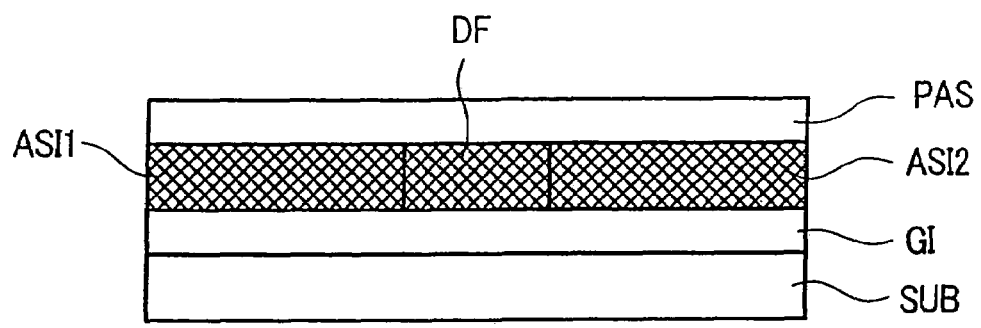
FIG. 4 is a schematic view for explaining a short-circuit defect state of the semiconductor film in FIG. 3.

FIG. 4 is a schematic view for explaining a short-circuit defect state of the semiconductor film shown in FIG. 3. That is, FIG. 4 shows a state in which semiconductor films ASI1, ASI2 which respectively constitute thin film transistors of neighboring pixels which are to be originally separated from each other are connected to each other by a short-circuit defect DF. An insulation film PAS is formed over the semiconductor films ASI1, ASI2.

Figure 5:
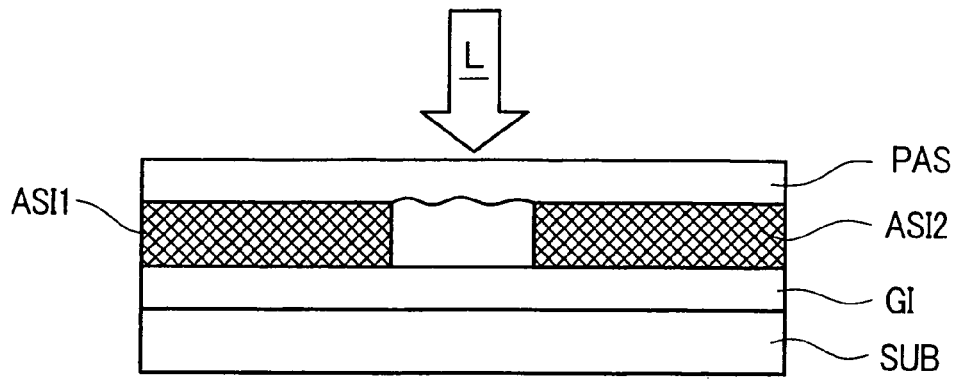
FIG. 5 is an explanatory view of the correction of the defect shown in FIG. 4 according to a manufacturing method of the present invention.

FIG. 5 is an explanatory view showing the correction of the defect shown in FIG. 4 according to the manufacturing method of the present invention. To separate the short-circuit defect DF, the laser beams L are irradiated from a side opposite to the substrate SUB, that is, from a position above the insulation film PAS. A wavelength of the laser beams is 266 nm and an output of the laser beams is 0.02 W/cm$^2$. The laser beams L are irradiated intermittently such that the laser beams L are irradiated for 5 nanoseconds per one irradiation (also referred to as shot) and the laser beams L are irradiated 10 shots with a shot interval of 0.3 seconds. As a result, as shown in FIG. 5, the short-circuit defect DF is removed while leaving the insulation film PAS formed above the short-circuit defect DF as it is and hence, the semiconductor films ASI1, ASI2 are separated from each other. Here, the correction of the standard deviation defect can be performed in the same manner.

The thin film transistor substrate SUB is cut into a given panel size. In this embodiment, two liquid crystal panels each having a nominal diagonal size of 38 cm is obtained. An orientation film is applied to the cut thin film transistor substrate and an orientation control function is provided to the orientation film by the rubbing or the like. On the other hand, a color filter substrate having color filters of multi-colors and an orientation film having an orientation control function is stacked to the thin film transistor substrate by a sealing member while forming a liquid crystal filling port at a portion of the color filter substrate. Then, a liquid crystal material is filled into a gap defined between both substrates through the liquid crystal filling port and is sealed therein. Drive circuits are mounted on terminals provided to peripheries of the panel thus completing the liquid crystal display device. When a lighting test is performed with respect to the liquid crystal display device manufactured in this manner, it is confirmed that the pixel which has the defect thereof corrected operates in the same manner as the normal pixel.

Here, for investigation, the liquid crystal display device is decomposed and the defect corrected portion of the thin film transistor substrate is observed using a scanning electron microscope. As a result, it is confirmed that the short-circuit defect DF of the semiconductor film ASI which is sandwiched by the gate insulation film GI and the insulation film (protective film) PAS is substantially completely removed or trimmed. Here, to perform the separation of the short-circuit defect, it is unnecessary to remove all extra portion and the separation may be performed by removing only a portion of the extra portion. The same substantially goes for embodiments described hereinafter and hence, the repeated explanation is omitted.

COMPARISON EXAMPLE 1

For a comparison purpose, laser beams are irradiated to perform a correction of a short-circuit defect of a semiconductor film similar to the above-mentioned short-circuit defect under following conditions. That is, laser beams having a wavelength of 266 nm and an output of 0.2 W/cm$^2$ are irradiated by one shot (one shot being 5 nanoseconds). As a result, it is found that although the semiconductor film ASI at the portion to be corrected is separated, an insulation film PAS arranged above the portion to be corrected is also destroyed together. When a liquid crystal display device is assembled using this thin film transistor substrate in the same manner as the above-mentioned embodiment, the portion to be corrected remains as a point defect and hence, the substantial correction is not performed.

COMPARISON EXAMPLE 2

Further, laser beams are irradiated to perform a correction of a short-circuit defect of a semiconductor film similar to the above-mentioned short-circuit defect under following conditions. That is, laser beams having a wavelength of 266 nm and an output of 0.04 W/cm$^2$ are irradiated by five shots (one shot being 5 nanoseconds) at an interval of 0.3 seconds. As a result, it is found that although the semiconductor film ASI at the portion to be corrected is separated, an insulation film PAS arranged above the portion to be corrected is also destroyed together in the same manner as the comparison example 1. When a liquid crystal display device is assembled using this thin film transistor substrate in the same manner as the above-mentioned embodiment, the portion to be corrected remains as a point defect and hence, the substantial correction is not performed.

COMPARISON EXAMPLE 3

Still further, laser beams are irradiated to perform a correction of a short-circuit defect of a semiconductor film similar to the above-mentioned short-circuit defect under following conditions. That is, laser beams having a wavelength of 532 nm and an output of 0.02 W/cm$^2$ are irradiated ten shots (one shot being 5 nanoseconds) at an interval of 0.3 seconds. As a result, it is found that the semiconductor film ASI at the portion to be corrected is not sufficiently separated. Here, it is also found that by increasing the output of the laser beams or by increasing the number of shots in this wavelength region, not only the semiconductor film ASI but also a film above the semiconductor film ASI is also damaged. When a liquid crystal display device is assembled using this thin film transistor substrate in the same manner as the above-mentioned embodiment, the portion to be corrected remains as a point defect and hence, the substantial correction is not performed.

As can be understood from these comparison examples, even when the laser beams having the same total energy as the above-mentioned embodiment are used by increasing the output of the laser beams and by decreasing the number of shots, the desired correction is not obtained. It is desirable that the output is equal to or less than 0.2 W/cm$^2$. It is desirable that the number of division of shots is 10 or more. Further, it is found effective to use the laser beams of a wavelength having the high absorbance for the film to be corrected than the film above the film to be corrected. Here, with respect to the shot interval, there exists the possibility that the upper-layer film is destroyed when the shot interval is excessively short and hence, it is desirable that the short interval is 0.3 seconds or more.

Second Embodiment

Figure 6:
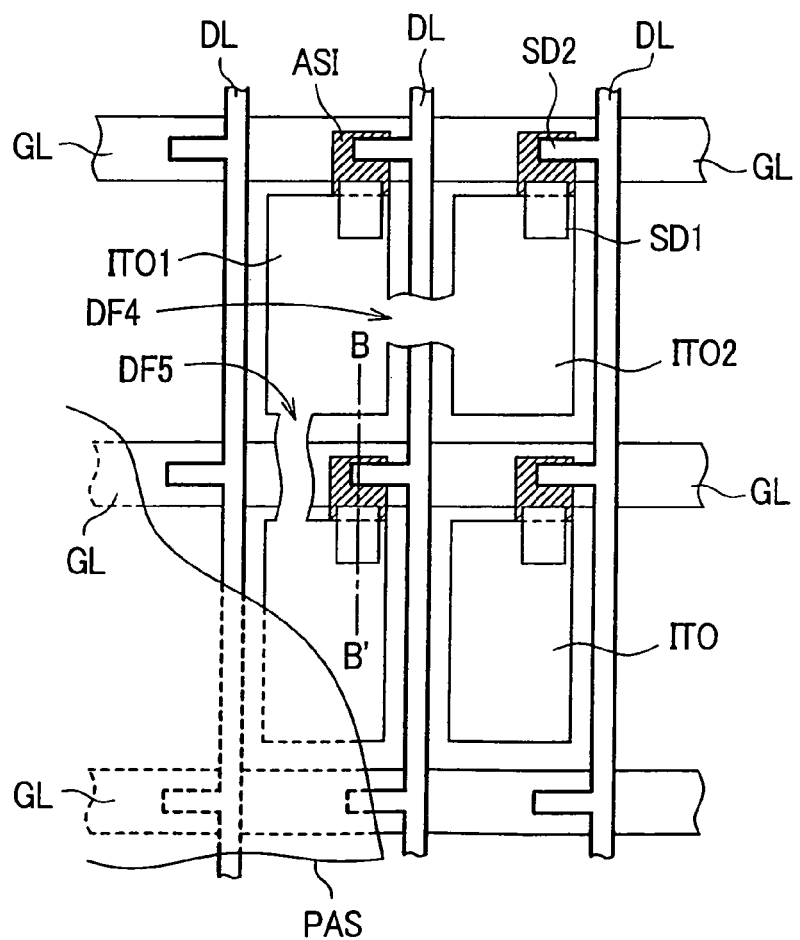
FIG. 6 is a plan view similar to FIG. 1 for explaining one example of a short-circuit defect of a pixel electrode which constitutes one of defects of a thin film formed on a thin film transistor substrate.

FIG. 6 is a plan view similar to FIG. 1 for explaining one example of a short-circuit defect of a pixel electrode which is one of defects of a thin film formed on a thin film transistor substrate. Here, the thin film transistor substrate shown in FIG. 6 has the layer structure having a protective film (insulation film) PAS as an uppermost layer (a layer below an orientation film since the orientation film is formed after correction). As shown in FIG. 6, pixel electrodes ITO of neighboring pixels are connected. Connecting portions are indicated by DF4 an DF5. These are short-circuit defects and it is necessary to separate these short-circuit defects to obtain normal pixels.

Figure 7:
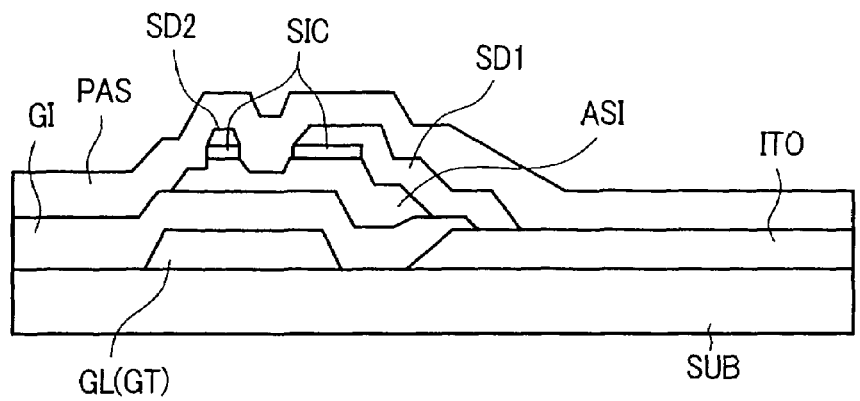
FIG. 7 is a cross-sectional view taken along a line B-B' in FIG. 6.

FIG. 7 is a cross-sectional view taken along a line B-B' in FIG. 6. In this thin film transistor substrate, a pixel electrode ITO which constitutes a transparent conductive film is formed as a layer below a protective film PAS. Other constitutions are equal to corresponding constitutions of the above-mentioned embodiment. This embodiment is provided for obtaining a normal pixel by separating short-circuit defects DF4, DF5 shown in FIG. 6.

Figure 8:
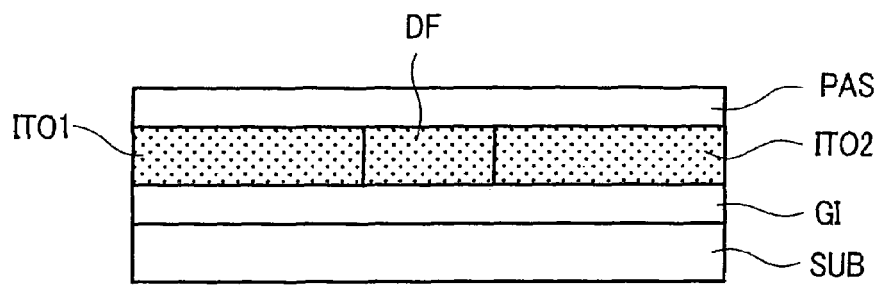
FIG. 8 is a schematic view for explaining a short-circuit defect state of the pixel electrode shown in FIG. 6.

FIG. 8 is a schematic view for explaining a short-circuit defective state of a pixel electrode in FIG. 6 and shows a state in which pixel electrodes ITO of neighboring pixels which are to be originally separated from each other are connected to each other by short-circuiting. An insulation film PAS is formed over the pixel electrode ITO.

Figure 9:
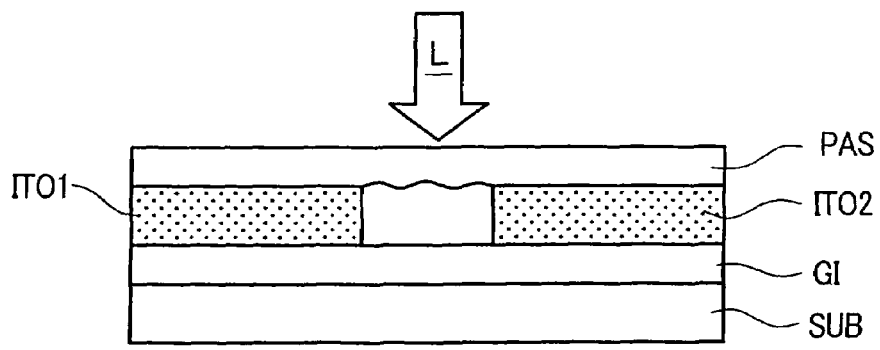
FIG. 9 is an explanatory view for explaining the correction of the defect shown in FIG. 8 according to a manufacturing method of the present invention.

FIG. 9 is an explanatory view showing the correction of the defect shown in FIG. 8 according to the manufacturing method of the present invention. To separate the short-circuit defect DF, the laser beams L are irradiated from a side opposite to the substrate SUB, that is, from a position above the insulation film PAS. A wavelength of the laser beams is 355 nm and an output of the laser beams is 0.01 W/cm$^2$. The laser beams L are irradiated intermittently such that the laser beams L are irradiated for 5 nanoseconds per one shot and the laser beams L are irradiated 20 shots with a shot interval of 0.3 seconds. As a result, as shown in FIG. 9, the short-circuit defect DF is removed and hence, the pixel electrodes ITO1, ITO2 are separated from each other. Since the manufacture of a liquid crystal display device using the thin film transistor substrate in which the defect is corrected in the above-mentioned manner is substantially equal to the manufacture of the liquid crystal display device in the above-mentioned embodiment, the repeated explanation is omitted. Also with respect to the liquid crystal display device of this embodiment, it is confirmed that the short-circuit defect DF is substantially completely removed and trimmed so that the liquid crystal display device can perform the normal operation. Here, even when the pixel electrode is formed of a metal film, it is possible to perform the correction of the short-circuit defect.

Third Embodiment

As shown in FIG. 7, in a thin film transistor substrate in which a pixel electrode (transparent conductive film) ITO is present between stacked films, to perform the separation correction of the short-circuit correction shown in FIG. 8, the laser beams L having a wavelength of 355 nm and an output of 0.04 W/cm$^2$ are irradiated from a side opposite to the substrate SUB (from the protective film PAS side) intermittently such that the laser beams L are irradiated by 10 shots with a shot interval of 0.3 seconds. Although a protective film PAS which constitutes a laser-beam irradiated portion is slightly damaged after the irradiation of the laser beams, as shown in FIG. 9, the short-circuit defect DF can be sufficiently separated. Since the manufacture of a liquid crystal display device using the thin film transistor substrate is substantially equal to the manufacture of the liquid crystal display device in the above-mentioned embodiment, the repeated explanation is omitted. Also with respect to the liquid crystal display device of this embodiment, it is confirmed that the short-circuit defect DF is substantially completely, removed and trimmed so that the liquid crystal display device can perform the normal operation.

Fourth Embodiment

Figure 10:
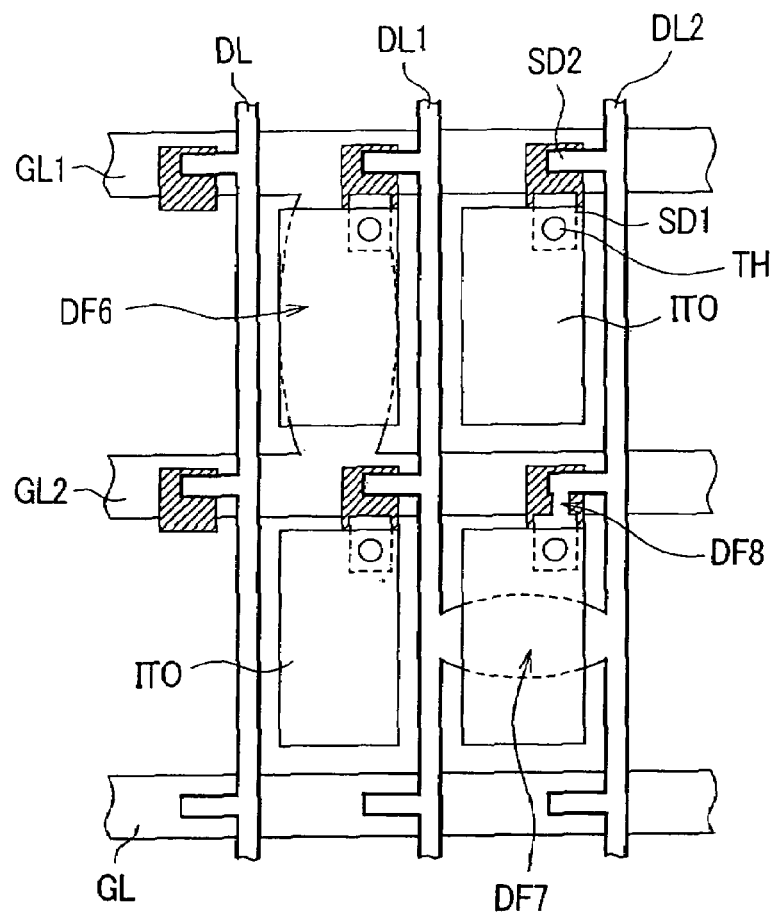
FIG. 10 is a plan view similar to FIG. 1 for explaining one example of a short-circuit defect of wiring or an electrode which constitutes one of defects of a thin film formed on the thin film transistor substrate.

FIG. 10 is a plan view similar to FIG. 1 for explaining one example of a short-circuit defect of lines or electrodes which constitute one of defects of a thin film formed on a thin film transistor substrate. In this embodiment, a short-circuit defect between metal lines in a stacked film formed in the thin film transistor substrate is corrected. FIG. 10 shows a state in which neighboring scanning signal lines GL1, GL2 which are to be originally separated from each other are connected to each other through a short-circuit defect DF6. Further, FIG. 10 shows a state in which neighboring video signal line DL1, DL2 which are to be originally separated from each other are connected to each other through a short-circuit defect DF7. Still further, FIG. 10 shows a short-circuit defect DF8 between a source electrode SD1 and a drain electrode SD2. To short-circuit defects generated between the scanning signal lines (gate signal lines) GL as well as between the video signal lines (data lines) DL formed on the thin film transistor substrate as shown in FIG. 10, the corrections are applied as follows. Here, the correction of the short-circuit defect between the video signal lines DL is explained as an example.

Figure 11:
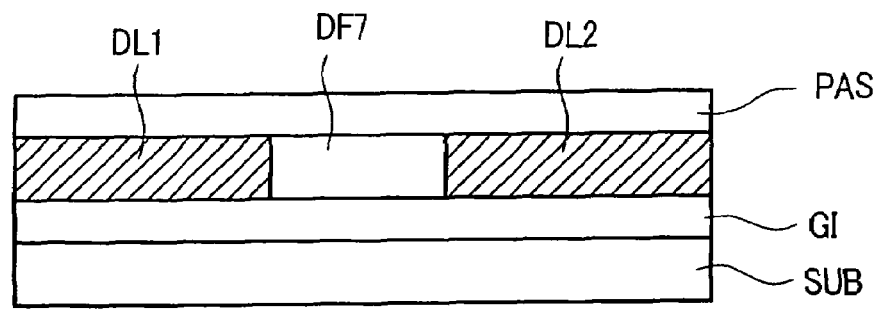
FIG. 11 is a schematic view for explaining a short-circuit defect state between video signal lines in FIG. 10.
Figure 12:
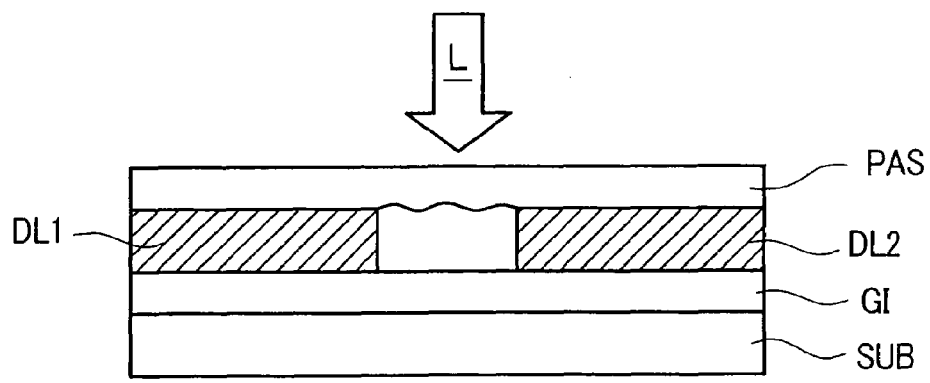
FIG. 12 is a schematic view for explaining a correction of a defect shown in FIG. 11 according to a manufacturing method of the present invention.

FIG. 11 is a schematic view for explaining a short-circuit defect state between the video signal lines in FIG. 10 and FIG. 12 is a schematic view for explaining the correction of the defect shown in FIG. 11 using the manufacturing method of the present invention. To separate the short-circuit defect DF7, the laser beams L are irradiated from a side opposite to the substrate SUB, that is, from a position above the insulation film PAS. A wavelength of the laser beams is 532 nm and an output of the laser beams is 0.04 W/cm². The laser beams L are irradiated intermittently such that the laser beams L are irradiated for 5 nanoseconds per one shot and the laser beams L are irradiated 5 shots with a shot interval of 0.3 seconds. As a result, although a slight damage remains on an insulation film PAS formed above the short-circuit defect DF7, as shown in FIG. 12, the short-circuit defect DF7 is removed and hence, the video signal lines DL1, DL2 are separated from each other.

Since the manufacture of a liquid crystal display device using the thin film transistor substrate is substantially equal to the manufacture of the liquid crystal display device in the above-mentioned embodiments, the repeated explanation is omitted. Also with respect to the liquid crystal display device of this embodiment, it is confirmed that the short-circuit defect is substantially completely removed and trimmed so that the liquid crystal display device can perform the normal operation.

Fifth Embodiment

Figure 13:
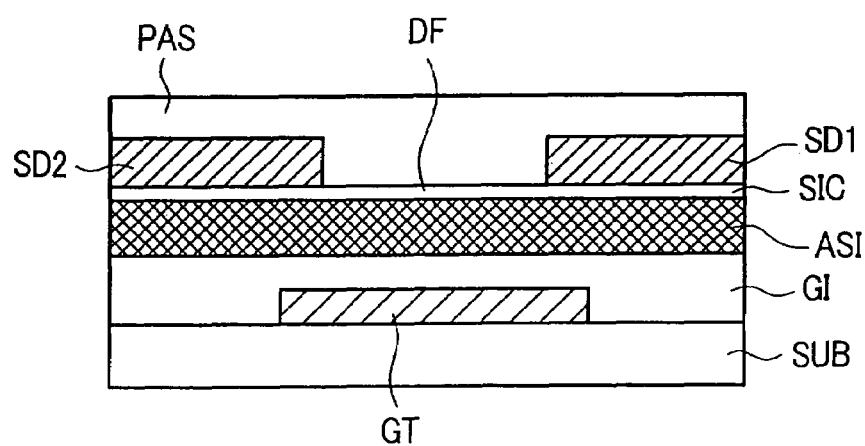
FIG. 13 is a cross-sectional view for explaining one example of a short-circuit defect of a contact film which constitutes a semiconductor film forming one of defects of a thin film formed on a thin film transistor substrate.

FIG. 13 is a cross-sectional view for explaining one example of a short-circuit defect of contact films forming semiconductor films which constitutes one of defects of a thin film formed on a thin film transistor substrate. In this embodiment, a short-circuit defect DF of contact films SIC constituting semiconductor films in stacked films formed over the thin film transistor substrate is corrected. In the drawing, symbol GT indicates a gate electrode. A gate insulation film GI, an a-silicon semiconductor film ASI, contact films SIC, a source electrode SDI and a drain electrode SD2, an insulation film PAS are stacked over the gate electrode GT in this order. Here, the contact films SIC which are arranged below the source electrode SD1 and the drain electrode SD2 must be originally separated from each other above the gate electrode GT. However, as shown in the drawing, the source electrode SD1 and the drain electrode SD2 are short-circuited through the contact film SIC. This embodiment provides the correction which separates the contact films SIC at such a portion.

Figure 14:
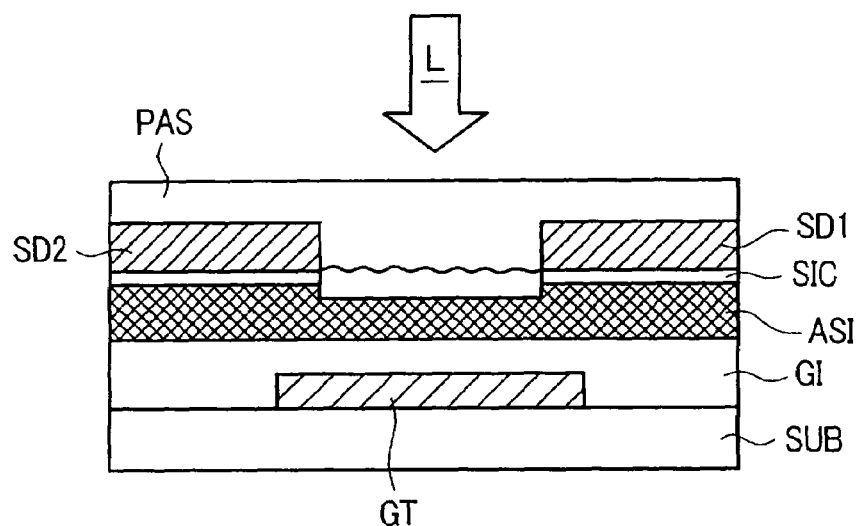
FIG. 14 is a schematic view for explaining the correction of the defect shown in FIG. 13 according to a manufacturing method of the present invention.

FIG. 14 is a schematic view for explaining the correction of the defect shown in FIG. 13 according to the manufacturing method of the present invention. To separate the short-circuit defect DF, the laser beams L are irradiated from a side opposite to the substrate SUB, that is, from a position above the insulation film PAS. A wavelength of the laser beams is 266 nm and an output of the laser beams is 0.02 W/cm². The laser beams L are irradiated intermittently such that the laser beams L are irradiated 2 shots with a shot interval of 0.3 seconds. As a result, as shown in FIG. 14, the contact film SIC which constitutes the semiconductor film is completely removed together with a portion of the lower-layer a-silicon semiconductor film ASI and hence, the contact films SIC are completely separated. Here, the gate insulation film GI and the gate electrode GT arranged below the semiconductor film to be corrected receive no damage at all. Further, the insulation film PAS above the removed contact film SIC also receives no damage.

Since the manufacture of a liquid crystal display device using the thin film transistor substrate is substantially equal to the manufacture of the liquid crystal display device in the above-mentioned embodiments, the repeated explanation is omitted. Also with respect to the liquid crystal display device of this embodiment, it is confirmed that the short-circuit defect DF is substantially completely removed and trimmed so that the liquid crystal display device can perform the normal operation.

Sixth Embodiment

Figure 15:
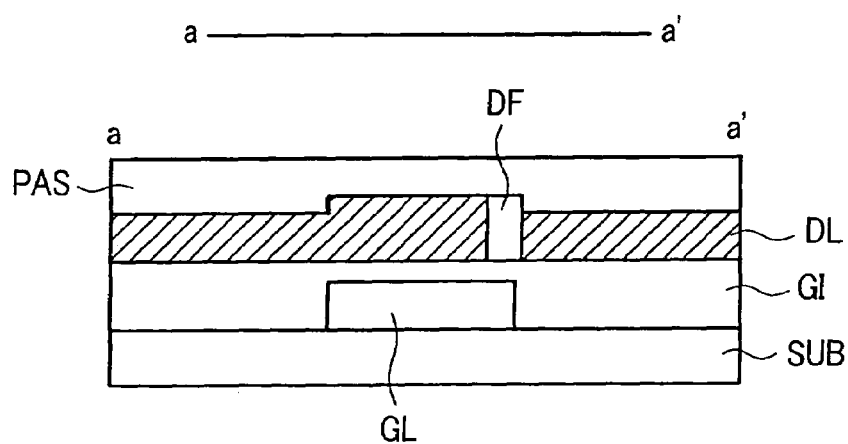
FIG. 15 is a schematic view for explaining an open defect of a video signal line on a cross section taken along a line a-a' in FIG. 1.
Figure 16:
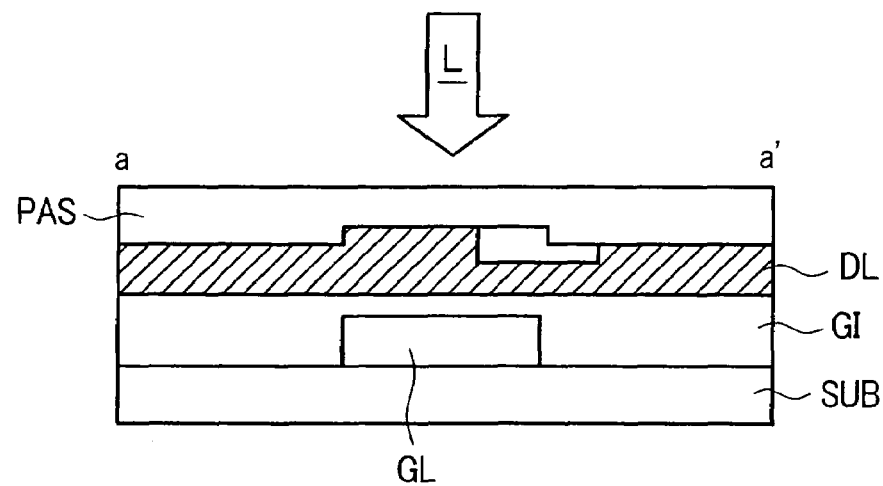
FIG. 16 is a schematic view for explaining the correction of the open defect shown in FIG. 15 according to the manufacturing method of the present invention.
Figure 17:
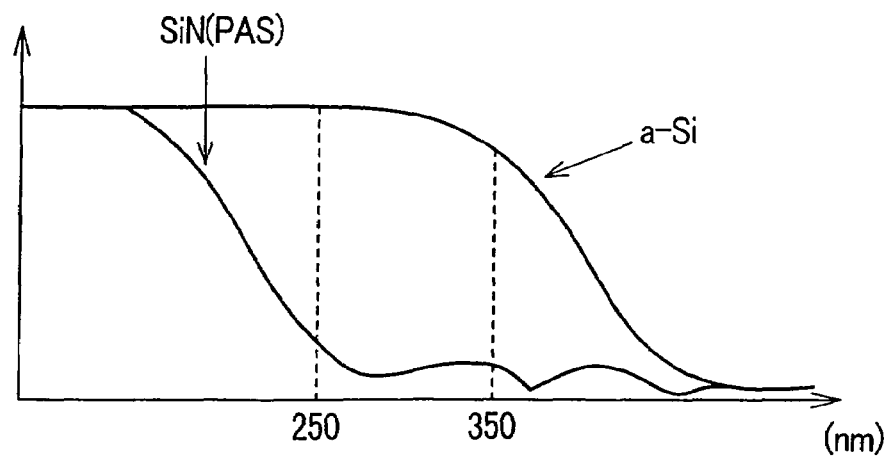
FIG. 17 is an explanatory view for explaining the relationship between wavelengths and absorbance of laser beams for various films which are formed on the substrate which constitutes the display device by taking the semiconductor and an insulation film as an example.

FIG. 15 is a schematic view for explaining an open defect of a video signal line in a cross section taken along a line a-a' in FIG. 1. FIG. 16 is a schematic view for explaining the correction of the open defect shown in FIG. 15 according to the manufacturing method of the present invention. As shown in FIG. 15, at a portion where a scanning signal line GL and a drain line (a video signal line) DL cross each other, the open defect DF is formed in the drain line DL due to a stepped portion of a scanning signal line GL which is arranged below the drain line DL. To correct the open defect DF, laser beams having a wavelength which are hardly absorbed by a protective film (insulation film) PAS and are absorbed by the drain line DL are irradiated to melt and fluidize a metal film which constitutes the drain line DL so as to restore the connection.

A wavelength of the laser beams used in this embodiment is 250 nm to 360 nm and an output of the laser beams is 0.02 W/cm² or less. The laser beams L are irradiated intermittently such that the laser beams L are irradiated 10 shots or more with a shot interval of 0.3 seconds or more. Since free-alkali glass used as a material of the substrate SUB is known as the material which absorbs this wavelength, the laser beams are intermittently irradiated from the protective film PAS side as shown in FIG. 16.

The connection correction of the open defect has other various application examples. To explain specific examples, they are as follows.

(a) the connection between the pixel electrodes made of a transparent conductive film or a metal layer (b) the connection between scanning signal lines made of a metal layer or between video signal lines made of a metal layer (c) the connection between lines made of a metal layer or a transparent conductive film (d) the connection between a line made of a metal layer and a line made of a transparent conductive film (e) the connection between electrodes made of a metal layer (f) the connection between a source electrode made of a metal layer and a pixel electrode made of a transparent conductive film or a metal layer (g) the connection between a scanning signal line, a video signal line or a line made of a metal layer and a terminal made of a transparent conductive film (h) the connection between a line made of a transparent conductive film and a terminal made of a transparent conductive film (i) the connection between a scanning signal line, a video signal line or a line made of a metal layer and a terminal made of metal (j) the connection between a line made of a transparent conductive film and a terminal made of metal (k) the connection between a scanning signal line or a video signal line made of a metal layer and a line made of metal (l) the connection between a scanning signal line or a video signal line made of a metal layer and a line made of a transparent conductive film The application examples are not limited to the above-mentioned specific examples and, according to the present invention, it is possible to perform the connection correction of the open defect of at least one of the scanning signal line, the video signal line, the pixel electrode, the wiring and the electrode.

Further, according to the present invention, it is possible to perform the connection correction of the open defect between two elements selected from a group consisting of the scanning signal line, the video signal line, the pixel electrode, the wiring, the electrode and the terminal.

Further, also with respect to the separation correction of the short-circuit defect, the removal correction of the standard deviation defect and the separation correction of the standard deviation defect, the present invention is not limited to the above-mentioned embodiments and is applicable to the semiconductor film, the insulation film and the conductive film in various portions (formed of either a metal film or a transparent conductive film, for example).

Further, also with respect to the film arranged above the film to be corrected, such a film is not limited to an insulation film (a protective film) and may be a transparent conductive film or the like.

As has been explained heretofore, according to the present invention, even when the protective film, the insulation film or the like is present above the film to be corrected, it is possible to provide the display device and the manufacturing method thereof which can eliminate the defective display by correcting only the defect of the film to be corrected below the upper-layer film without damaging the upper-layer film thus enhancing the reliability of the display device and the manufacturing method.

What is claimed is:

1. A manufacturing method of a display device comprising:
a film forming step in which a plurality of films including an insulation film, a semiconductor film and a conductive film are stacked onto a substrate; and
a defect portion correcting step in which at least one correction out of a short-circuit defect portion separation correction which separates a short-circuit defect, an open defect portion connection correction which performs a connection of an open defect, a standard deviation defect portion removal correction which performs a removal of a standard deviation defect, and a standard deviation defect portion separation correction which performs a separation of a standard deviation defect portion generated in the formed film is performed, wherein
at a point of correction time of the defect portion correction step, at least one upper-layer film is present above a film to be corrected at the correction portion and the correction is applied to the film to be corrected while leaving the upper-layer film as it is,
the correction is performed by irradiating laser beams,
an output of the laser beams is set to 0.02 W/cm$^2$ or less,
the laser beams are irradiated from above the substrate through the upper-layer film to the correction portion, and
a wavelength of the laser beams is set to a wavelength that allows the laser beams to be more easily absorbed in the film to be corrected than in the upper-layer film.

2. A manufacturing method of a display device according to claim 1, wherein the laser beams are irradiated to the same portion by dividing the laser beams plural times.

3. A manufacturing method of a display device according to claim 2, wherein the laser beams are irradiated to the same portion by dividing the laser beams at least 10 times.

4. A manufacturing method of a display device according to claim 2, wherein an irradiation interval of the laser beams is equal to or more than 0.3 seconds.

5. A manufacturing method of a display device according to claim 1, wherein when the film to be corrected is an amorphous silicon semiconductor film, a wavelength of the laser beams is set to 250 nm to 360 nm.

6. A manufacturing method of a display device according to claim 1, wherein the laser beams to be irradiated to the same portion are irradiated by dividing the laser beams 10 or more times.

7. A manufacturing method of a display device according to claim 1, wherein the upper-layer film includes at least either one of an insulation film and a transparent conductive film.

8. A manufacturing method of a display device according to claim 1, wherein the semiconductor film is an amorphous semiconductor film and the amorphous semiconductor film is subjected to the separation correction or the removal correction.

9. A manufacturing method of a display device according to claim 1, wherein an activated layer of a thin film transistor which has a source electrode and a drain electrode is constituted by the semiconductor film, the semiconductor film includes an intrinsic semiconductor film and a contact film formed over the intrinsic semiconductor film, wherein the separation correction of a defect which short-circuits the source electrode and the drain electrode through the contact film is performed by removing the contact film present between the source electrode and the drain electrode together with a portion of the intrinsic semiconductor film.

10. A manufacturing method of a display device according to claim 1, wherein the conductive film is at least one of a scanning signal line, a video signal line and a pixel electrode, and the separation correction is at least one of corrections of a short-circuit defect between the scanning signal lines, a short-circuit defect between the video signal lines and a short-circuit defect between the pixel electrodes.

11. A manufacturing method of a display device according to claim 10, wherein the pixel electrode is a transparent conductive film.

12. A manufacturing method of a display device according to claim 1, wherein a normal display is performed by the correction.

* * * * *